April 13, 1937.   O. K. WINDING   2,076,804
PROPEL SCOOTER
Filed April 1, 1935
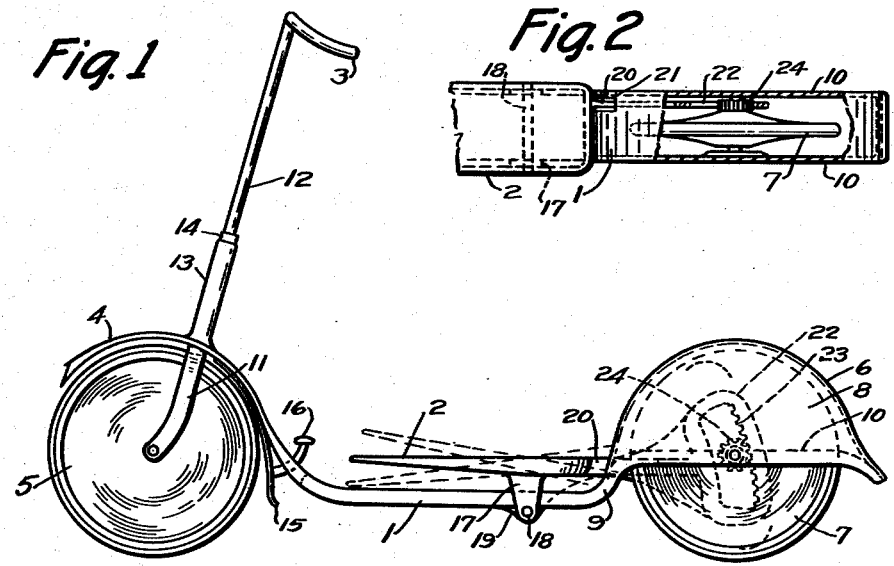
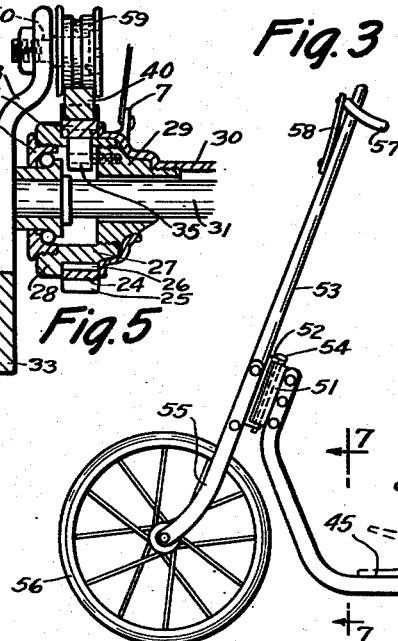
INVENTOR.
Ove K. Winding
BY
James Harrison Bowen
ATTORNEY.

Patented Apr. 13, 1937

2,076,804

UNITED STATES PATENT OFFICE 2,076,804

PROPEL SCOOTER

Ove K. Winding, New York, N. Y.

Application April 1, 1935, Serial No. 14,133

2 Claims. (Cl. 208—37)

The purpose of this invention is to provide means for propelling a scooter by standing with both feet thereon.

The invention is a scooter of the type having a front and rear wheel with a platform positioned therebetween, in which a pedal is pivotally mounted on the platform and connected through the driving mechanism to the rear wheel and as the pedal is operated the device will be propelled forward whereas the pedal may stop in any position and the device may continue to move, as in free wheeling.

Scooters have normally been provided with platforms having wheels at the ends and a handle and in some the handle is connected to the front wheel and pivotally attached to the platform to facilitate steering, and many others are provided with seats and propelling means of various types. This device, however, provides a pedal sufficiently large to accommodate both of the feet and this pedal may remain stationary while the device is moving or may be moved upward and downward with the toe of one foot moving it downward and the heel of the other foot moving it upward by pressing the rear end thereof downward, and this pedal is connected to the rear wheel so that it will rotate the wheel with a forward movement as it is moved downward and so that it will be disengaged from the wheel as it moves upward, thereby permitting the scooter to continue to move forward as the pedal moves upward or while it is held in a stationary position.

The object of the invention is, therefore, to provide a scooter of the self-propelled type having a pedal by which it may be operated in which the pedal may readily be released from the driving wheel.

Another object is to provide a scooter having a pedal by which it may be propelled in which the pedal is sufficiently large to accommodate both of the feet of the operator.

Another object is to provide a scooter of the self-propelled type having a pedal by which it is operated in which both feet are kept continuously upon the pedal and the toes of the feet force the pedal downward to drive the device forward whereas it is raised by the heel of one foot.

Another object is to provide a scooter of the self-propelled type in which a free wheeling clutch is incorporated permitting the pedal by which it is driven to remain stationary as the device moves forward.

A further object is to provide a scooter of the self-propelled type having a pedal adapted to accommodate both of the feet of the operator and upon which the feet remain constantly in which the pedal may remain stationary as the device moves forward and in which all of the operating parts are in engagement while the device is being propelled and also when the pedal is stationary.

And a still further object is to provide a scooter of the self-propelled type having a free wheeling clutch incorporated therein, which is of a simple and economical construction.

With these ends in view the invention embodies a scooter of the type having a platform with wheels at the ends, a handle by which it may be steered, and a pedal pivotally mounted on said platform and connected to the rear wheel in such a manner that as the pedal is moved downward it will drive the scooter forward and when the pedal is stationary, or being moved upward the scooter will continue to move forward.

Other features and advantages of the invention will appear from the following description taken in connection with the drawing, wherein:—

Figure 1 is a view showing a side elevation of the scooter.

Figure 2 is a plan view of the rear portion of the scooter shown in Figure 1 with parts broken away.

Figure 3 is a view shoowing a scooter of an alternate design in which the foot pedal operates the rear wheel with a different movement.

Figure 4 is a plan view of the rear portion of the scooter shown in Figure 3.

Figure 5 is a detail showing a section through the rear wheel mounting of the scooter shown in Figure 3, however, the same wheel mounting may be used with either design.

Figure 6 is a detail showing the ratchet which forms the free running clutch.

Figure 7 is a cross section on line 7—7 of Figure 3 with parts omitted.

Figure 8 is a similar section on line 8—8 of Figure 3 with parts omitted.

In the drawing the scooter is shown as it may be made wherein numeral 1 indicates the platform, numeral 2 the pedal and numeral 3 the handles.

It will be understood that the platform may be of any type or design and may be arranged in any manner. The platform is preferably supported on two wheels and provided with a handle at the forward end by which the front wheel may be turned for steering. The position of the platform is relatively low, however, it will be understood that the position of the platform in relation to the wheels may be changed as desired.

In the design shown in Figure 1 the platform is formed with a straight portion as indicated by the numeral 1 and the forward end 4 is curved upward and over a wheel 5 and the rear is also curved upward forming a hood 6 over a rear wheel 7. In the design shown the hood 6 is formed of side plates 8. However, it will be understood that these plates may be omitted so that the space for the wheels will be open. It will be noted that the frame members at the sides of the platform 1 curve upward at the point 9 and extend backward as indicated by the dotted lines 10 so that the axle of the rear wheel may be mounted therein. This part of the frame may, however, be formed in any manner. The wheel 5 is mounted in a yoke 11 similar to the yoke used in the front wheel of a bicycle and this is formed with a shaft or rod 12 which is slidably mounted in a bearing 13 on the upper side of the end 4 of the platform and the shaft is also rotatable in this bearing and may be provided with a set collar 14 by which its position may readily be adjusted. The handles 3 are formed on the upper end of the member 12 and in the design shown the handles are integral with the rod or shaft and it will be understood that they may be attached to the upper end of the handle as shown in Figure 3 or mounted thereon by any means. On the under side of the end 4 is a spring 15 having a knob 16 that extends through the platform 1 and it will be noted that as the knob 16 is pressed downward it will force the spring member 15 against the wheel thereby forming a brake. It will be understood that the brake may be provided in the rear wheel as shown in Figure 3 instead of on the front wheel and any type of brake may be used.

The pedal 2 is provided with downwardly extending flanges 17 and the lower ends of these flanges are pivotally mounted on a pin 18 mounted in projections 19 extending downward from the under side of the platform. The pedal may, however, be pivotally mounted on the platform in any other manner. In the design shown in Figure 1 a bar 20 extends backward from the pedal through an opening 21 in the hood 6, as shown in Figure 2 and on the opposite end of this bar is a gear segment 22 with a gear rack 23 formed therein and the rack meshes with a gear 24 mounted on the rear wheel 7 as shown in Figure 5, and it will be noted that as the backward end of the pedal 2 is moved upward and downward it will move the segment 22 so that it will rotate the gear 24 and drive the rear wheel.

The rod 20, connecting the pedal to the rack 23 is formed so that it does not extend above the plane or surface of the pedal between the pedal and rear wheel. This connection, therefore, allows absolute freedom for the feet and legs ahead of the wheel.

The gear 24 is formed with a ring as shown in Figure 6 with the gear teeth 25 on the outer surface, and the ratchet teeth 26 on the inner surface, and this gear is rotatably mounted on a sleeve 27 of a bushing 28 that is threaded on a smaller bushing 29, and the bushing 29 is threaded into a hub 30 of the wheel 7. The outer end of the bushing 27 is mounted on the end of the axle 31 of the rear wheel by a ball bearing 32, as shown in Figure 5, and the outer end of the axle is mounted in one of the side bars 10 of the frame shown in Figures 1 and 2, or in a side bar 33 of the frame shown in Figures 3, 4 and 5, with the outer end of the shaft held by a nut 34. On the inside of the bushing 27 is a dog 35 that is pivotally mounted on a pin 36 and resiliently held upward by a spring 37 in a recess 38 in the inner portion 39 of the bushing 29. It will be understood, however, that the dog and spring may be of any design and may be formed in any manner, and a spring of any type may be used.

In the design shown in Figure 3 the gear 24 meshes with a rack 40 on the end of a bearing 41 which is pivotally attached to a pedal 42 through a bracket 43 and a pin 44. The bracket 43 is attached to the upper side of the pedal and the pedal is pivotally mounted on a platform 45 through a U-shaped bracket 46 as shown in Figure 8 in which the side members of the bracket extend downward over the sides of the platform 45 and are pivotally mounted on a pin 47 that is mounted in a bearing 48 on the under side of the platform. In this design the platform is formed with a board, which is indicated by the numeral 45, and this is mounted between side bars 33 and 49, the rear ends of which are curved upward to form bearings for the axle 31 and the forward ends of which are drawn together with a triangular shaped board 50 between them, as shown in Figure 7, and their upper ends are attached to a bearing 51 which is pivotally mounted in a bracket 52 to a handle 53 through a pin 54. The lower end of the handle 53 is provided with side bars 55 forming a yoke in which the forward wheel 56 is mounted and the upper end is provided with a handle bar 57 which may be held by a plate 58.

In this design the rack 40 engages with a gear 24 and is held in engagement therewith by a roller 59 which is mounted in the upper end of the side bar 33 by a stud bolt 60 as shown in Figure 5. This roller may be of any type or design and may be mounted in any manner.

The scooter in the design shown in Figure 3 is provided with a spring member 61 which is attached to the lower side of the board 45 as shown at the point 62 and extends upward through a slot 63, as shown in Figures 3 and 4, with the upper part thereof positioned in front of the rear wheel which is indicated by the numeral 64, and it will be noted that this member forms a guard for the wheel and at the same time may be pressed backward against the wheel to form a brake. It will be understood, however, that a brake of any type or design may be used.

It will be understood that other changes may be made in the construction without departing from the spirit of the invention, one of which changes may be in the use of a platform or frame of any type or design, another may be in the use of wheels of any other design, and still another may be in the use of other means for connecting the pedal to the rear wheel in order to drive the device therewith.

The construction will be readily understood from the foregoing description.

In use the device may be provided in either of the designs shown, and it will be noted that with the upper end of the handle held by the hands, one may step upon the pedal and with the right foot slightly forward of the left, and with the left positioned so that the heel is behind the pivot point, the pedal may readily be operated upward and downward and as it moves downward it will propel the device forward.

As soon as the pedal arrives with the forward end in the lower position, the device may continue to rotate as the ratchet releases the rear wheel permitting the part with the dog mounted thereon to rotate with the dog 35 passing over the ratchet teeth 26. This construction also permits the pedal to be raised with the wheel rotating forward so that with a continuous forward motion of the device the pedal may be moved upward and downward or held stationary as may be desired.

Having thus fully described the invention, what I claim as new, and desire to secure by Letters Patent is:

1. A scooter of the type having two aligned wheels, one at the front and one at the back, an underslung platform suspended below the centers of the wheels, and a handle pivotally attached to the forward end of the platform and in which the front wheel is mounted; a treadle extending across the face of the platform whereby it will accommodate both feet of the operator, means pivotally mounting said treadle on said platform and spacing it a short distance therefrom, said means comprising members extending downward at the sides of the platform and pivoted to the platform, said pivot point being located adjacent the rear thereof, a rack, a toothed wheel, a free-wheeling clutch on the rear wheel of said scooter upon which said toothed wheel is mounted, said toothed wheel adapted to drive the rear wheel of the scooter, and adapted to be acted upon by said rack, and means operating said rack by said treadle in which the operating means extending backward from the treadle does not extend above the surface thereof, between the pedal and rear wheel.

2. A scooter of the type having two aligned wheels, one at the front and one at the back, an underslung platform suspended below the centers of the wheels, and a handle pivotally attached to the forward end of the platform and in which the front wheel is mounted; a treadle extending across the face of the platform whereby it will accommodate both feet of the operator, means pivotally mounting said treadle on said platform and spacing it a short distance therefrom, said means comprising members extending downward at the sides of the platform and pivoted to the platform, a rack, a toothed wheel, a free-wheeling clutch on the rear wheel of said scooter upon which said toothed wheel is mounted, said toothed wheel adapted to drive the rear wheel of the scooter, and adapted to be acted upon by said rack, and means operating said rack by said treadle in which the operating means extending backward from the treadle does not extend above the surface thereof, between the pedal and rear wheel.

OVE K. WINDING.